(12) United States Patent
Minami et al.

(10) Patent No.: US 10,173,630 B2
(45) Date of Patent: Jan. 8, 2019

(54) AIRBAG DEVICE

(71) Applicant: ASHIMORI INDUSTRY CO., LTD., Osaka-shi, Osaka (JP)

(72) Inventors: Yuta Minami, Osaka (JP); Daijiro Katayama, Osaka (JP); Satoshi Yamashita, Osaka (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 14 days.

(21) Appl. No.: 15/667,346

(22) Filed: Aug. 2, 2017

(65) Prior Publication Data
US 2018/0037185 A1 Feb. 8, 2018

(30) Foreign Application Priority Data
Aug. 8, 2016 (JP) .................................. 2016/155717

(51) Int. Cl.
| | |
|---|---|
| *B60R 21/16* | (2006.01) |
| *B60R 21/215* | (2011.01) |
| *B60R 21/2334* | (2011.01) |
| *B60R 21/237* | (2006.01) |
| *B60R 21/264* | (2006.01) |
| *B60R 21/201* | (2011.01) |

(Continued)

(52) U.S. Cl.
CPC .......... *B60R 21/215* (2013.01); *B60R 21/201* (2013.01); *B60R 21/217* (2013.01); *B60R 21/237* (2013.01); *B60R 21/2334* (2013.01); *B60R 21/264* (2013.01); *B60R 2021/0004* (2013.01); *B60R 2021/0032* (2013.01)

(58) Field of Classification Search
CPC . B60R 21/217; B60R 21/215; B60R 21/2334; B60R 21/201; B60R 21/264; B60R 21/237; B60R 2021/0004; B60R 2021/0032
USPC .................................. 280/732, 743.1, 743.2
See application file for complete search history.

(56) References Cited

U.S. PATENT DOCUMENTS

| | | | |
|---|---|---|---|
| 6,196,585 B1 * | 3/2001 | Igawa ................... | B60R 21/237 280/728.1 |
| 7,234,728 B2 * | 6/2007 | Noguchi ............... | B60R 21/232 280/730.2 |

(Continued)

FOREIGN PATENT DOCUMENTS

JP 2013-010430 1/2013

*Primary Examiner* — Toan C To
(74) *Attorney, Agent, or Firm* — Hamre, Schumann, Mueller & Larson, P.C.

(57) ABSTRACT

Provided is an airbag device that is to be mounted in a vehicle, and includes: an inflator configured to generate a gas; an airbag configured to be inflated with the gas generated by the inflator; a holding member housing the airbag in a folded state and being provided with an opening which allows inflation and deployment of the airbag therethrough; and a flap configured to restrict inflation and deployment of the airbag through the opening, the airbag including a roll folded portion being roll-folded and disposed on an occupant side, and two flip folded portions each being accordion-folded or tucked inside and disposed on a vehicle front side, the flap including a first restricting portion covering the roll folded portion and being held between the roll folded portion and the holding member, and a second restricting portion being secured to the airbag between the two flip folded portions.

4 Claims, 12 Drawing Sheets

(51) Int. Cl.
*B60R 21/217* (2011.01)
*B60R 21/00* (2006.01)

(56) References Cited

U.S. PATENT DOCUMENTS

| | | | | |
|---|---|---|---|---|
| 2004/0251669 A1* | 12/2004 | Fischer | ............... | B60R 21/237 |
| | | | | 280/743.1 |
| 2009/0152842 A1* | 6/2009 | Benny | ................... | B60R 21/201 |
| | | | | 280/728.3 |
| 2012/0326421 A1* | 12/2012 | Motomochi | ......... | B60R 21/205 |
| | | | | 280/732 |
| 2013/0241184 A1* | 9/2013 | Sakai | .................... | B60R 21/205 |
| | | | | 280/743.1 |
| 2015/0115577 A1* | 4/2015 | Miura | ................... | B60R 21/201 |
| | | | | 280/728.2 |
| 2017/0080891 A1* | 3/2017 | Inazumi | ............... | B60R 21/237 |

\* cited by examiner

AIRBAG DEVICE

CROSS-REFERENCE TO RELATED APPLICATIONS

The present application claims priority under 35 U.S.C. § 119 to Japanese Patent Application No. 2016-155717 filed on Aug. 8, 2016, the contents of which are incorporated herein by reference in their entirety.

BACKGROUND OF THE INVENTION

Field of the Invention

The present invention relates to airbag devices. The present invention specifically relates to an airbag device that is suited for occupant protection in a frontal collision of a vehicle and is disposed on the vehicle front side of an occupant.

Discussion of the Background

An airbag device disposed on the vehicle front side of an occupant is inflated and deployed in front of the occupant in a frontal collision of the vehicle to catch the occupant who is thrown forward. However, if the airbag device is activated when the occupant is seated in an abnormal position referred to as "out of position" (OOP) such as a leaning-forward position compared with the normal seating position, the occupant may come into contact with the airbag being rapidly inflated and deployed and may be strongly pressed by the airbag.

A conventional airbag device disclosed in JP 2013-010430 A is an airbag device for a passenger seat which avoids unnecessary pressing of a neighboring object positioned near the portion in the instrument panel where the airbag is stowed. This airbag device includes a cover placed around a folded airbag in a rear-to-front manner to prevent the airbag from moving toward an occupant seated nearby in the initial inflation stage. The airbag device also has a recess at substantially the center of the occupant contact portion in the lateral direction so as to flow the gas to the sides of the occupant seated nearby.

SUMMARY OF THE INVENTION

The airbag device for a passenger seat disclosed in JP 2013-010430 A can still be improved in provision of safety to an OOP occupant. The airbag device for a passenger seat disclosed in JP 2013-010430 A also has problems of a complicated airbag shape and a complicated production process due to the recess provided at substantially the center of the occupant contact portion of the airbag in the lateral direction.

The present invention has been made to solve the above problems, and aims to provide an airbag device that can secure the safety of an occupant even when activated in a situation where the occupant is in an abnormal position and that has excellent productivity.

For solution of the above problems and achievement of the aim, one aspect of the present invention is directed to an airbag device to be mounted in a vehicle, including: an inflator configured to generate a gas; an airbag configured to be inflated with the gas generated by the inflator; a holding member housing the airbag in a folded state and being provided with an opening which allows inflation and deployment of the airbag therethrough; and a flap configured to restrict inflation and deployment of the airbag through the opening, the airbag including a roll folded portion being roll-folded and disposed on an occupant side, and two flip folded portions each being accordion-folded or tucked inside and disposed on a vehicle front side, the flap including a first restricting portion covering the roll folded portion and being held between the roll folded portion and the holding member, and a second restricting portion being secured to the airbag between the two flip folded portions.

The airbag device of the present invention provides improved safety to an occupant seated in an abnormal position by controlling the airbag shape in the initial stage of inflation and deployment. The airbag device also has excellent productivity owing to the uncomplicated shape of its airbag.

DESCRIPTION OF EMBODIMENTS

Hereinafter, an airbag device of an embodiment of the present invention is described with reference to the drawings.

Figure 1:
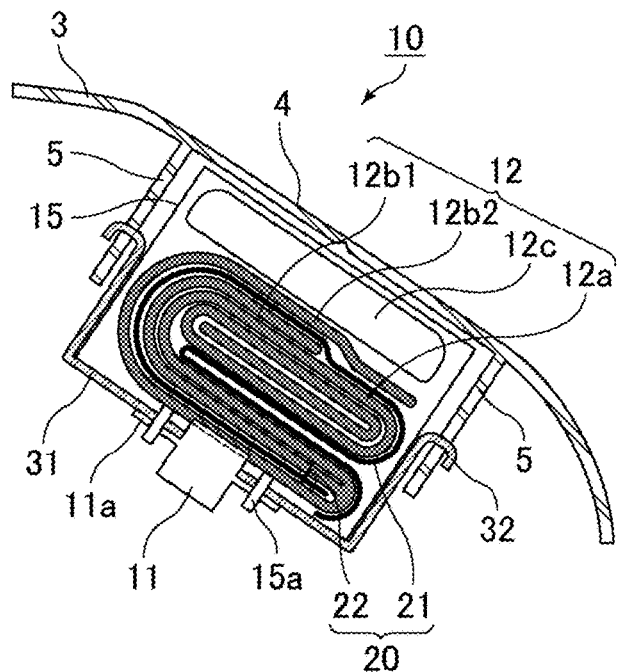
FIG. 1 is a cross-sectional view of an initial configuration of an airbag device of an embodiment from a vehicle lateral side.
Figure 2:
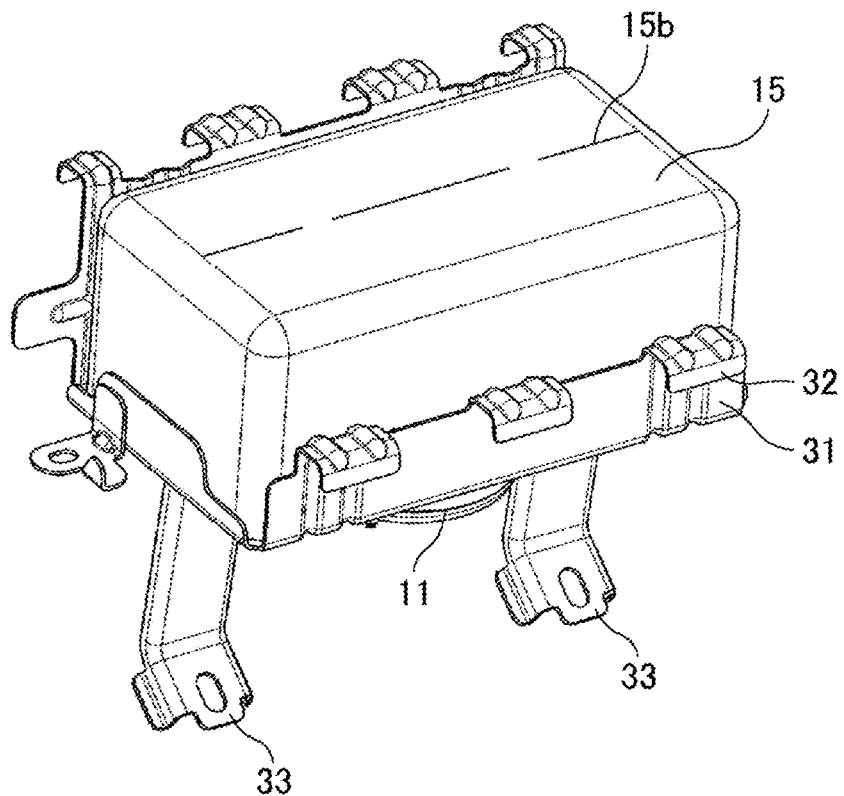
FIG. 2 is a perspective view of the initial configuration of the airbag device of the embodiment.

First, the initial configuration of the airbag device of the embodiment is described with reference to FIGS. 1 and 2. An airbag device 10 of the embodiment is disposed at the inner upper surface of an instrument panel 3 in front of a passenger seat, and at least includes an inflator (gas generator) 11, a bag-like airbag 12, a holding member 15 including the airbag 12 in a folded state, and a flap 20 configured to restrict inflation and deployment of the airbag 12. The term "initial configuration" as used herein refers to a configuration before ignition of the inflator 11, i.e., before inflation and deployment of the airbag 12.

The inflator 11 is activated in a frontal collision of the vehicle. First, when an impact sensor mounted on the vehicle detects a frontal collision of the vehicle, the sensor transmits a signal to ECU and the ECU calculates and determines the collision level. If the determined collision level corresponds to a level at which the airbag 12 should be inflated, the inflator 11 is ignited to generate a gas through a chemical reaction by combustion. The generated gas is emitted into the airbag 12 through gas exhaust holes of the inflator 11. The inflator 11 may be of any type, and may be a pyrotechnic inflator which utilizes a gas generated by combusting a gas-generating agent, a stored gas inflator utilizing a compressed gas, or a hybrid inflator utilizing a gas mixture of a gas generated by combusting a gas-generating agent and a compressed gas, for example.

The airbag 12 has a bag-like shape and is stowed in a folded state in the holding member 15 disposed at the inner upper surface of the instrument panel 3 before the inflator 11 is activated. When the inflator 11 is activated, the gas generated by the inflator 11 is introduced into the airbag 12 such that the airbag 12 is inflated while unfolded. The inflated airbag 12 pushes open an opening 15b of the holding member 15 and a lid 4 of the instrument panel 3 to come out to the interior space of the vehicle and be inflated and deployed. The airbag 12 consists of a roll folded portion 12a, two flip folded portions 12b1 and 12b2, and end-folded portions 12c. The airbag 12 is controlled by the folding pattern thereof and the restriction by the flap 20 such that the roll folded portion 12a disposed on an occupant 1 side is inflated after the flip folded portions 12b1 and 12b2 and the end-folded portions 12c are inflated. The flap 20 is configured to restrict inflation of the roll folded portion 12a and restrict the direction of inflation and deployment of the flip folded portions 12b1 and 12b2. Such a configuration enables prevention of the airbag 12 from rapidly moving out to the head of the occupant 1 seated in an abnormal position referred to as "out of position" (OOP), thereby providing improved safety.

The airbag 12 can be formed from, for example, nylon 66 yarn or polyethylene terephthalate (PET) yarn. In order to improve the heat resistance and the airtightness, the surface of the airbag 12 may be covered with an inorganic material such as silicone.

The holding member 15 is a housing cloth provided with, on its occupant 1 side portion (top portion), a slit (opening) 15b which allows inflation and deployment of the airbag 12 therethrough. A holding member provided with intermittent slits 15b as illustrated in FIG. 2 is preferred. The connected parts between the slits 15b will be broken by the airbag 12 when the airbag 12 is inflated and deployed.

The holding member 15 is provided on its bottom portion with an installation hole for the inflator 11 into which the inflator 11 is inserted. On the bottom portion inside the airbag 12 is disposed a metallic retaining plate (not illustrated) provided with an installation hole for the inflator 11. The retaining plate is provided with four bolts 15a protruding downward around the installation hole for the inflator 11. The respective bolts 15a threaded through the airbag 12, the holding member 15, a metal housing 31, and flanges 11a of the inflator 11 are fastened with nuts, so that these components are fixed.

The metal housing 31 has hooks 32 on its sidewalls and is mounted by the hooks 32 on peripheral walls 5 that protrude to the backside of the instrument panel 3. The metal housing 31 also has mounting portions 33 protruding from its bottom portion and is mounted by the mounting portions 33 on the vehicle.

The flap 20 is a band-like member, with one end being held between the airbag 12 and the holding member 15 and the other end being coupled to the airbag 12. In the initial stage of inflation and deployment of the airbag 12, the airbag 12 is inflated with the one end of the flap 20 being held between the airbag 12 and the holding member 15, so that the tension generated in the flap 20 can restrict the shape and direction of inflation and deployment of the airbag 12. The other end of the flap 20 may be coupled to the airbag 12 by any method such as sewing, adhesion, or welding, and sewing is preferred.

For the other components of the airbag device 10, known airbag structures for a passenger seat can be utilized.

Next, the configurations of the airbag 12 and the flap 20 are described in detail based on an example of the folding process of the airbag 12 of the embodiment with reference to FIGS. 3 to 6. FIG. 3A, FIG. 4A, FIG. 5A, and FIG. 6A are plan views of the airbag 12. FIG. 3B, FIG. 4B, and FIG. 5B are side views of the airbag 12 in the directions of the respective arrows X1 indicated in FIG. 3A, FIG. 4A, and FIG. 5A. FIG. 5C and FIG. 6B are side views of the airbag 12 in the directions of the respective arrows X2 indicated in FIG. 5A and FIG. 6A. In FIG. 5C, the airbag 12 in a folded state illustrated in FIGS. 5A and 5B is illustrated simply as a rectangle. The letters F and R in the drawings respectively indicate the vehicle front side and the vehicle rear side in a state where the airbag device 10 is mounted on the vehicle.

As illustrated in FIGS. 3, the vehicle front F side of the airbag 12 is tucked inside such that the two flip folded portions 12b1 and 12b2 are formed. To one of the surfaces of the two flip folded portions 12b1 and 12b2 facing each other is coupled the flap 20 by inserting an end of the flap 20 between the two flip folded portions 12b1 and 12b2. Thereby, a second restricting portion 22 of the flap 20 is formed which secures the end of the flap 20 to the airbag 12 between the two flip folded portions 12b1 and 12b2a.

Figure 3A:
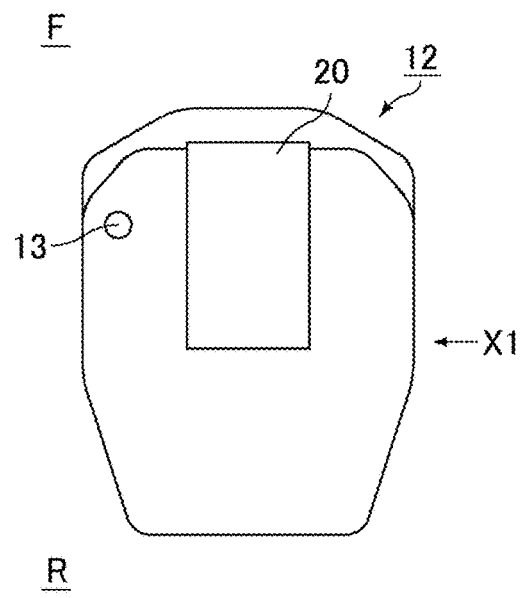
FIGS. 3A and 3B are views for describing the folding process of the airbag of the embodiment, with FIG. 3A being a plan view of the airbag, and FIG. 3B being a side view of the airbag from the direction of an arrow X1 indicated in FIG. 3A.
Figure 3B:
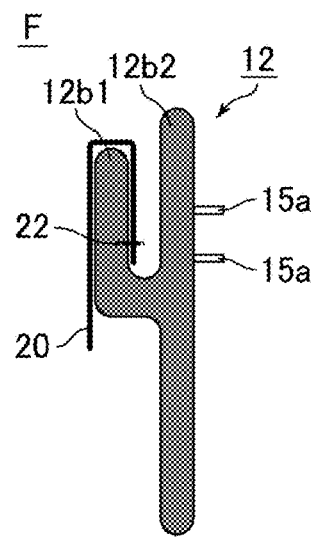

Although FIG. 3B illustrates the airbag 12 whose vehicle front F side is tucked inside, a second restricting portion having the same function as that illustrated in FIG. 3B can also be formed by accordion-folding the vehicle front F side of the airbag and inserting an end of the flap between the two flip folded portions formed by the accordion-folding.

The flip folded portion 12b2 is provided with an inflator installation hole. To the inflator installation hole is inserted the portion with gas exhaust holes of the inflator 11. Thereby, the gas generated by the inflator 11 can be supplied into the airbag 12. With the inflator installation hole provided to the flip folded portion 12b2, inflation of the flip folded portion 12b2 can be facilitated in the initial stage of inflation and deployment of the airbag 12. The inflator installation hole of the airbag 12 is provided in a region surrounded by the four bolts 15a protruding from the retaining plate (not illustrated) disposed on the inside of the airbag 12, and is located between the two illustrated bolts 15a in FIG. 3B.

The flip folded portion 12b1 is provided with vent holes 13 for exhausting a gas in the airbag 12. When the inflated and deployed airbag 12 catches the occupant 1 thrown forward and is thereby pressed, the inner pressure in the airbag 12 may increase too high to cause the airbag 12 to be too firm. Since too firm an airbag 12 may damage the occupant, the gas in the airbag 12 is appropriately exhausted through the vent holes 13 so that the absorption characteristics of the airbag 12 can be controlled. The vent holes 13 may be arranged at any positions in the airbag 12 in the present embodiment, and may be arranged at any part other than the flip folded portion 12b1. The number and size of the vent holes 13 can also be appropriately selected to achieve the desired absorption characteristics.

Figure 4A:
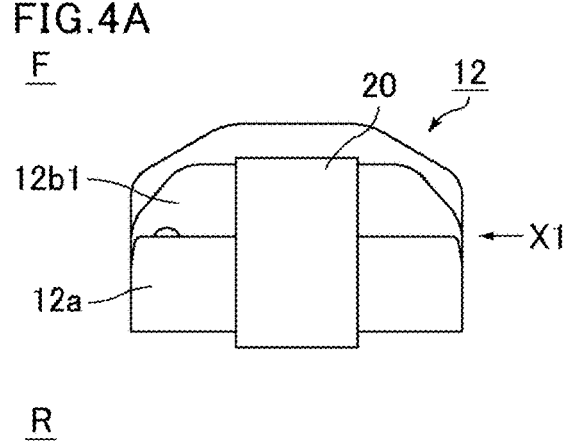
FIGS. 4A and 4B are views for describing the folding process of the airbag of the embodiment, with FIG. 4A being a plan view of the airbag, and FIG. 4B being a side view of the airbag from the direction of an arrow X1 indicated in FIG. 4A.
Figure 4B:
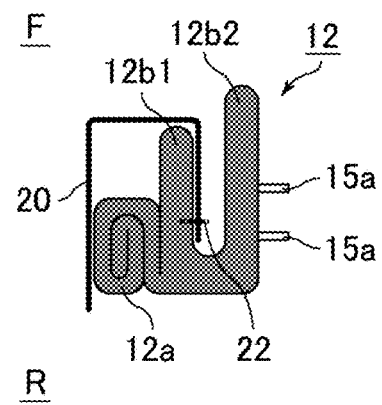
Figure 5A:
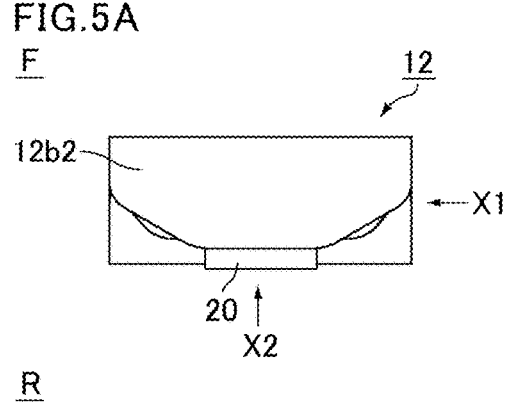
FIGS. 5A, 5B and 5C are views for describing the folding process of the airbag of the embodiment, with FIG. 5A being a plan view of the airbag, FIG. 5B being a side view of the airbag from the direction of an arrow X1 indicated in FIG. 5A, and FIG. 5C being a side view of the airbag from the direction of an arrow X2 indicated in FIG. 5A.
Figure 5B:
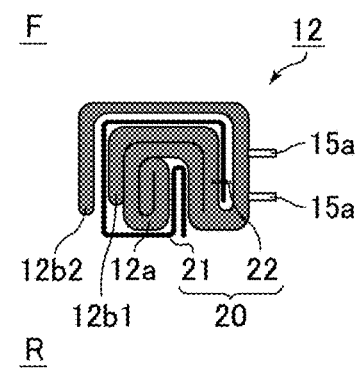
Figure 5C:
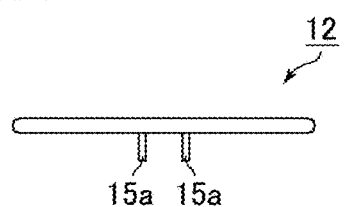

After the flip folded portions 12b1 and 12b2 are formed, the vehicle rear R side of the airbag 12 is roll-folded several times and disposed on the occupant side of the flip folded portion 12b1 as illustrated in FIGS. 4A and 4B, whereby the roll folded portion 12a is formed. The flap 20 is disposed to cover the flip folded portion 12b1 and the roll folded portion 12a. As illustrated in FIGS. 5A, 5B and 5C, the flap 20 covers the vehicle rear R side of the roll folded portion 12a. When the airbag 12 is stowed in the holding member 15, the portion of the flap 20 covering the vehicle rear R side of the roll folded portion 12a constitutes a first restricting portion 21 of the flap 20 that restricts inflation of the roll folded portion 12a and the flip folded portion 12b1. As illustrated in FIGS. 5A, 5B and 5C, part of the flap 20 may be folded into the roll folded portion 12a. Also, the flip folded portion 12b2 is folded onto the vehicle front F side of the flap 20 to cover the roll folded portion 12a.

Figure 6A:
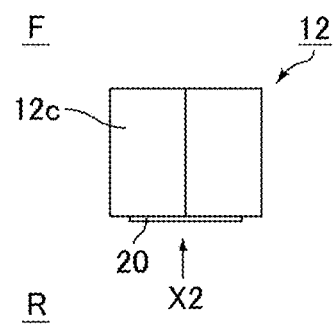
FIGS. 6A and 6B are views for describing the folding process of the airbag of the embodiment, with FIG. 6A being a plan view of the airbag, and FIG. 6B being a side view of the airbag in the direction of an arrow X2 indicated in FIG. 6A.
Figure 6B:
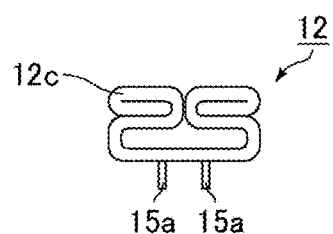

Subsequently, as illustrated in FIGS. 6A and 6B, each end of the airbag 12 located at a laterally outer position compared with the flap 20 is folded onto the flap 20 (on the opening 15b side), so that the end-folded portions 12c are formed. The airbag 12 folded thereby is stowed inside the holding member 15.

As described above, the airbag 12 of the present embodiment has an uncomplicated shape in which the roll folded portion 12a and the flip folded portions 12b1 and 12b2 are integrally formed, though these portions are distinguished from each other in the airbag 12 in a folded state. The roll folded portion 12a and the flip folded portions 12b1 and 12b2 are formed in the airbag 12 by combination of flip folding and roll folding.

The present embodiment utilizes the folding manner of the airbag 12 to control the inflation shape and the deployment direction in the initial stage of inflation and deployment of the airbag 12. In other words, since the roll folded portion 12a is less likely to be unfolded and to allow entry of a gas than the flip folded portions 12b1 and 12b2, the flip folded portions 12b1 and 12b2 are first inflated and deployed in activation of the inflator 11, followed by inflation and deployment of the roll folded portion 12a which is located closer to the occupant. This configuration can prevent the airbag 12 in rapid inflation and deployment from strongly pressing the occupant.

The airbag 12 of the present embodiment also utilizes the flap 20 to control the inflation shape and the deployment direction in the initial stage of inflation and deployment of the airbag 12. When a gas is generated by the inflator 11, the flip folded portions 12b1 and 12b2, which easily allow entry of gases, are inflated. Here, the first restricting portion 21 of the flap 20 held between the holding member 15 and the roll folded portion 12a of the airbag 12 restricts inflation and deployment of the roll folded portion 12a. Specifically, when the flip folded portions 12b1 and 12b2 of the airbag 12 are inflated, the roll folded portion 12a is pushed toward the holding member 15 side and a pressure to clamp the first restricting portion 21 is produced, whereby the flap 20 can tightly restrict inflation and deployment of the roll folded portion 12a.

Next, with reference to FIGS. 7 to 12, normal inflation and deployment of the airbag 12 of the present embodiment is described. The arrow FR and arrow UP illustrated in these drawings respectively indicate the forward direction and the upward direction of a vehicle.

Figure 7:
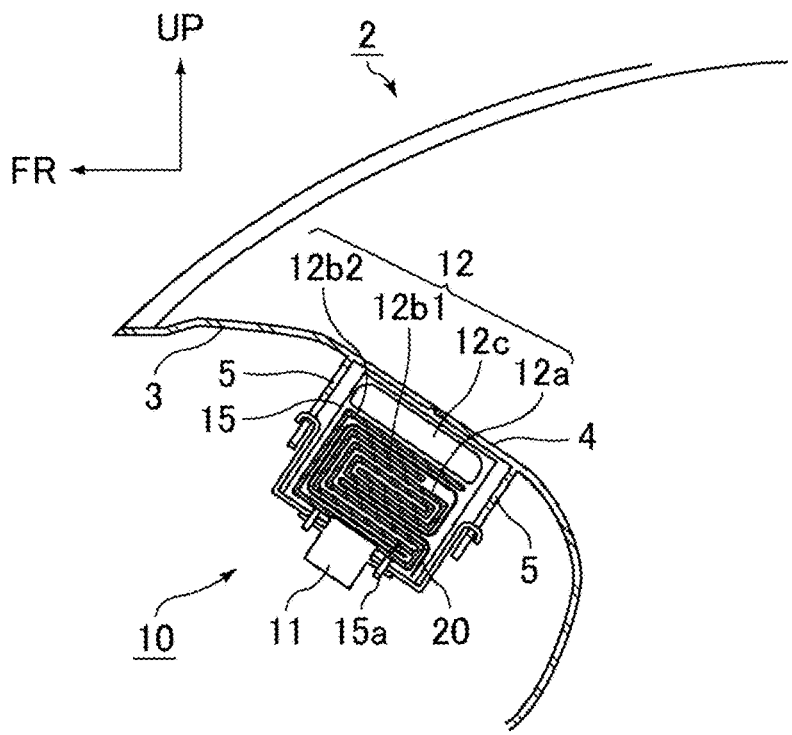
FIG. 7 is a cross-sectional view related to normal inflation and deployment of the airbag of the embodiment, illustrating an initial state before the inflation and deployment.

In the initial state before the airbag 12 is inflated and deployed, as illustrated in FIG. 7, the end-folded portions 12c are located on the lid 4 side (the upward-direction side of the vehicle) of the instrument panel 3, while the bottom portions of the two flip folded portions 12b1 and 12b2 (the flip folded portion 12b2 is provided with the inflator installation hole) are located on the inflator 11 side (the forward-direction side of the vehicle). In other words, the airbag 12 is roll-folded and flip-folded to the vehicle front and rear sides, and the end-folded portions 12c, which are the ends of the airbag 12 in the vehicle width direction in a folded state with the long side set in the vehicle width direction, are folded onto the occupant side of the flap 20 located at the center of the airbag 12 in the vehicle width direction. Thereby, when a gas is introduced into the airbag 12 in a folded state and the airbag 12 is slightly inflated, the end-folded portions 12c are pushed to the lid 4 side to break the tear lines of the holding member 15 and the lid 4, opening the doors of the lid 4. As a result, an opening is formed through which the airbag device is communicated with the interior space of the vehicle.

Figure 8:
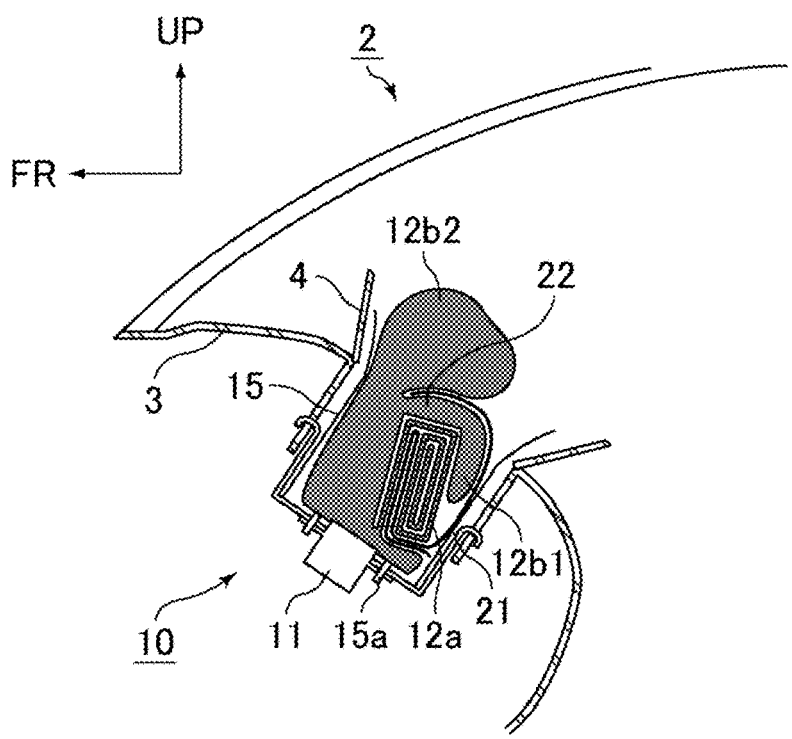
FIG. 8 is a cross-sectional view related to normal inflation and deployment of the airbag of the embodiment, illustrating a state immediately after the inflation and deployment.

As illustrated in FIG. 8, when a collision of a vehicle 2 is detected and then the airbag device 10 is activated, the airbag 12 is rapidly inflated by the gas generated by the inflator 11. In the initial stage of inflation and deployment where the airbag 12 begins to be inflated and deployed, the flip folded portions 12b1 and 12b2 of the airbag 12 in a folded state which are more likely to allow entry of the gas than the roll folded portion 12a are first inflated, and are inflated and deployed through the opening 15b of the holding member 15. At this time, the second restricting portion 22, being secured to the airbag 12 between the flip folded portions 12b1 and 12b2, is moved as the flip folded portions 12b1 and 12b2 are inflated. Simultaneously, the roll folded portion 12a is pushed toward the holding member 15 side by the flip folded portion 12b1, so that inflation and deployment of the roll folded portion 12a are inhibited. Since inflation of the flip folded portions 12b1 and 12b2 leads to inflation of the end-folded portions 12c communicating with the respective ends of the flip folded portions 12b1 and 12b2, the end-folded portions 12c push open the lid 4 to come out to the interior space of the vehicle and be inflated and deployed in the interior space of the vehicle as described above.

Figure 9:
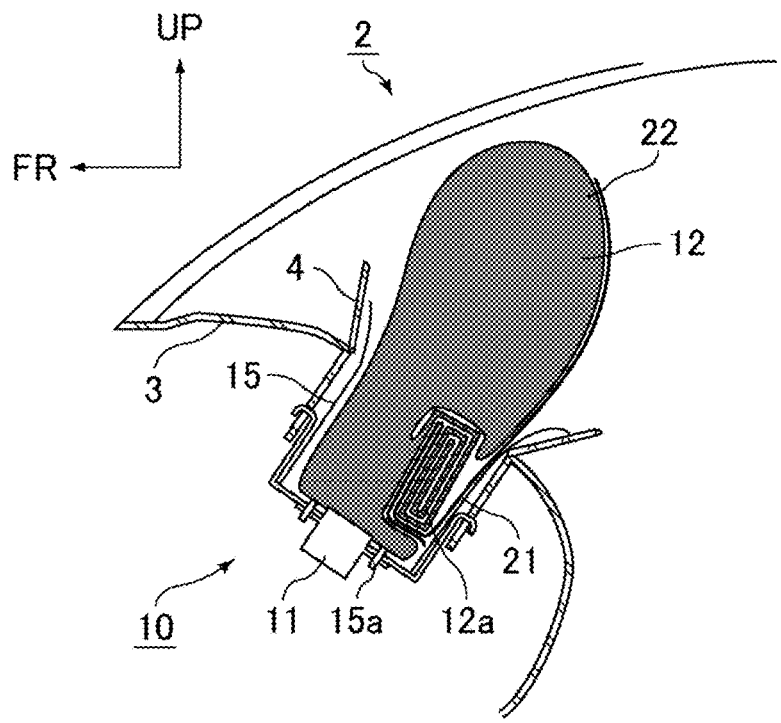
FIG. 9 is a cross-sectional view related to normal inflation and deployment of the airbag of the embodiment, illustrating a state where the shape and direction of the inflation and deployment are restricted by a flap under tension.

To each of the inflated flip folded portions 12b1 and 12b2 is further introduced the gas, which causes further inflation as illustrated in FIG. 9. As a result, the flip folded portions 12b1 and 12b2 form one inflated portion, with the second restricting portion 22 being exposed on the outer surface of the airbag 12. Here, as the flip folded portion 12b1 to which the second restricting portion 22 is secured is further inflated while the first restricting portion 21 is held by the holding member 15, tension is generated in the flap 20 between the second restricting portion 22 secured to the one inflated portion and the first restricting portion 21 held between the holding member 15 and the roll folded portion 12a of the airbag 12. If no tension is applied to the airbag 12 by the flap 20, the airbag 12 would be inflated by the inner pressure therein into a spherical shape. Such inflation into a spherical shape does not occur in the present invention since the flap 20 generating tension allows inflation of the flip folded portions 12b1 and 12b2 to the vehicle front side while restricting their inflation to the vehicle rear side.

Although the first restricting portion 21 side end of the flap 20 may not be secured as illustrated in FIG. 9, the first restricting portion 21 side end of the flap 20 may be provided with holes through which the bolts 15a are passed. Joining the first restricting portion 21 side end of the flap 20 with the bolts 15a can increase the tension generated in the flap 20. In this case, the timing to release the tension may be controlled by providing a cut at a near-end part of the flap 20.

The first restricting portion 21 side end of the flap 20 may be drawn out of the holding member 15 through at least one slit provided to the outer periphery of the holding member 15. With this configuration, the first restricting portion 21 side end of the flap 20 can be kept at the same position during the process of placing the airbag 20 in the folded state into the holding member 15.

Figure 10:
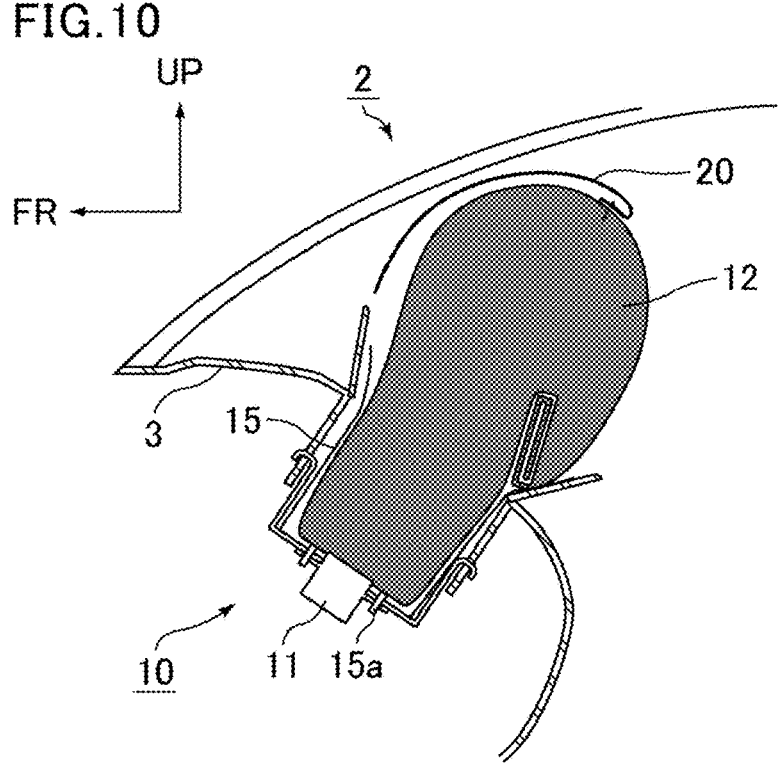
FIG. 10 is a cross-sectional view related to normal inflation and deployment of the airbag of the embodiment, illustrating a state immediately after removal of the restriction by the flap.
Figure 11:
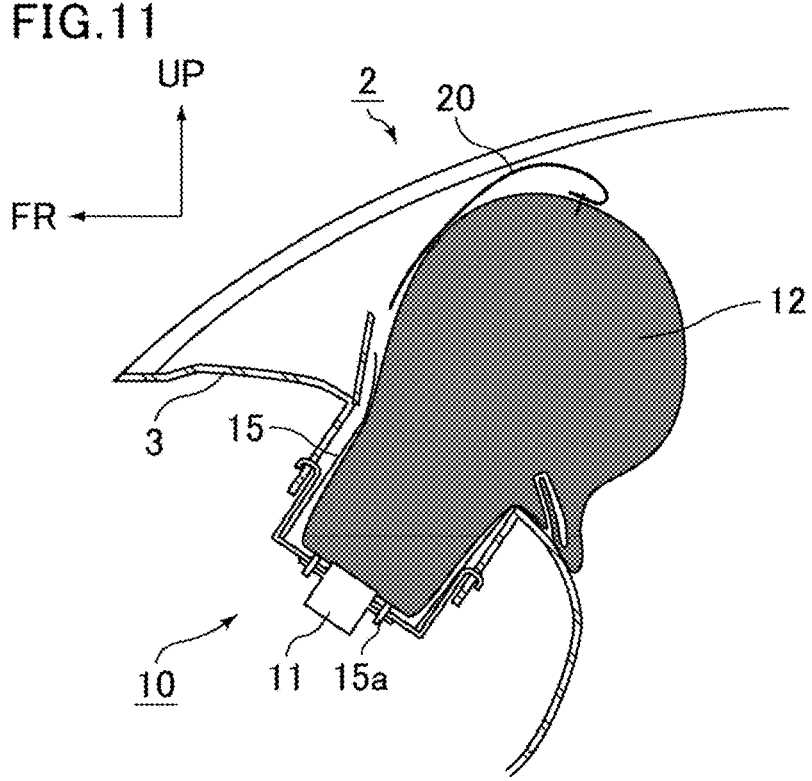
FIG. 11 is a cross-sectional view related to normal inflation and deployment of the airbag of the embodiment, illustrating a state after removal of the restriction by the flap.
Figure 12:
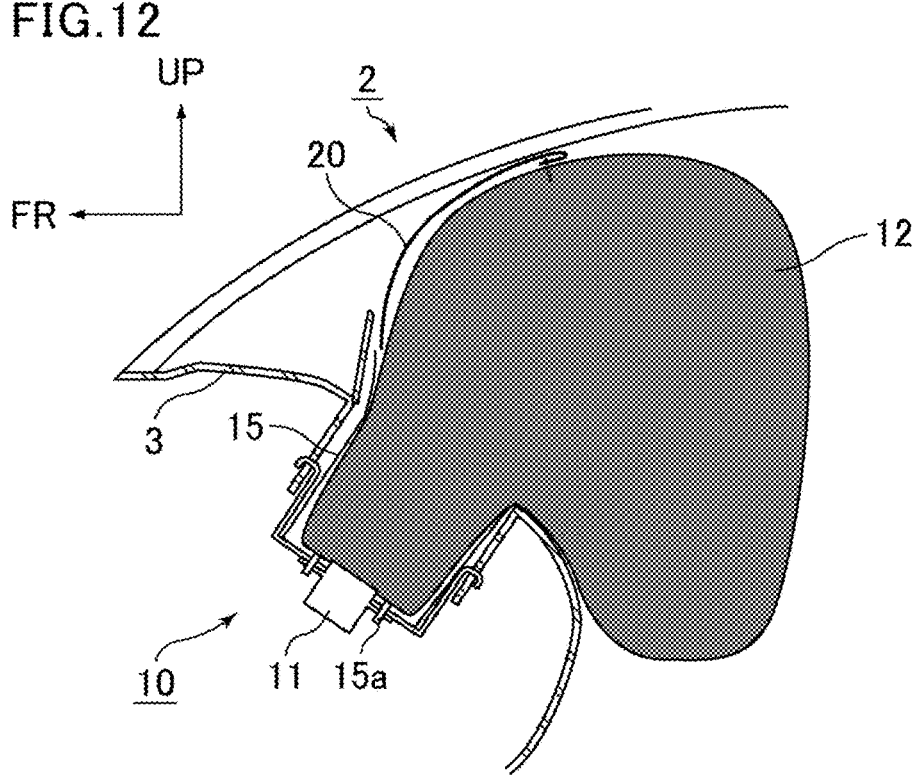
FIG. 12 is a cross-sectional view related to normal inflation and deployment of the airbag of the embodiment, illustrating a complete state of the inflation and deployment.

As illustrated in FIG. 10, the airbag 12 is then further inflated and deployed to cause the first restricting portion 21 of the flap 20 to be drawn out of the portion between the holding member 15 and the roll folded portion 12a of the airbag 12, so that the tension generated in the entire flap 20 is released. The release of tension allows inflation and deployment of the roll folded portion 12a, leading to inflation and deployment of the entire airbag 12 as illustrated in FIG. 11. The airbag 12 is inflated and deployed to the state illustrated in FIG. 12. Since inflation and deployment of the roll folded portion 12a results in inflation of the entire airbag 12, the airbag 12 can exert the same protection function as a normal airbag.

The airbag 12 of the present embodiment is normally inflated and deployed as described above, properly protecting an occupant seated in a normal position. Since the airbag 12 of the present embodiment is folded by combination of flip folding and roll folding, the flip folded portions 12b1 and 12b2 disposed on the vehicle front side are first inflated and deployed in the initial stage of inflation and deployment. Thereby, the inflation and deployment timing of the roll folded portion 12a disposed on the occupant side is controlled. The flap 20 generating tension then restricts inflation and deployment of the flip folded portions 12b1 and 12b2 to the occupant side. This configuration can prevent the airbag 12 from protruding to the occupant side in the initial stage of inflation and deployment, thereby providing better airbag safety than conventional configurations.

The two flip folded portions 12b1 and 12b2 have their bottoms disposed on the vehicle front side of the roll folded portion 12a and their ends disposed on the vehicle rear side of the roll folded portion 12a. Here, at least part of each of the two flip folded portions 12b1 and 12b2 may be disposed on the vehicle front side of the roll folded portion 12a.

In the case that the airbag device 10 of the present embodiment is activated when the occupant is in an abnormal position referred to as "out of position" (OOP) such as a leaning-forward position compared with the normal seating position, the airbag device 10 can prevent the inflated and deployed airbag 12 from excessively pressing the occupant and secure the safety of the occupant by protecting especially the head of the occupant.

Hereinafter, with reference to FIGS. 13 to 18, the case is described in which the airbag device 10 of the present embodiment is activated when the head of the OOP occupant 1 is in contact with a portion of the instrument panel 3 in the vicinity of the lid 4.

Figure 13A:
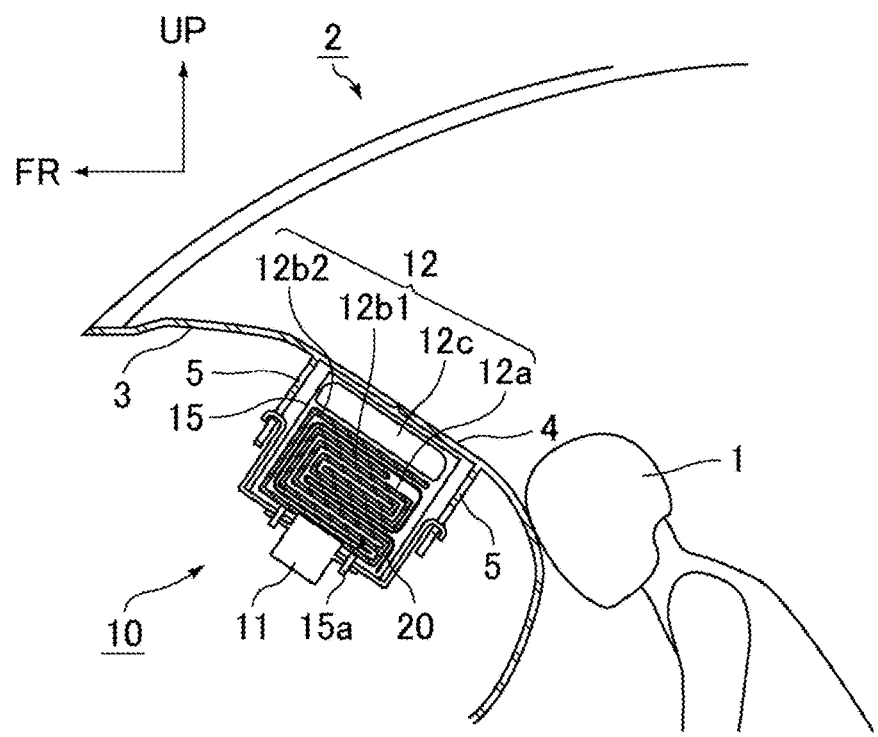
FIGS. 13A and 13B are views related to OOP inflation and deployment of the airbag of the embodiment, illustrating an initial state before the inflation and deployment, with FIG. 13A being a cross-sectional view thereof and FIG. 13B being a front view thereof.
Figure 13B:
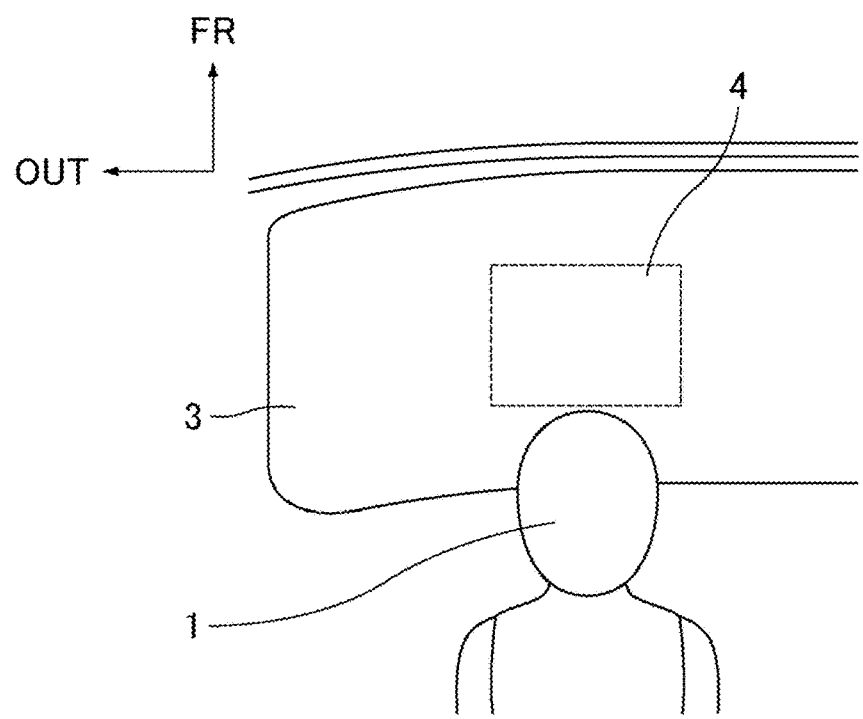

First, in the initial state before the airbag is inflated and deployed, as illustrated in FIGS. 13A and 13B, the airbag device 10 is in the same state as that illustrated in FIG. 7. Here, the difference is that the head of the occupant 1 (for example, a child) is in contact with a portion of the instrument panel 3 in the vicinity of the lid 4.

Figure 14A:
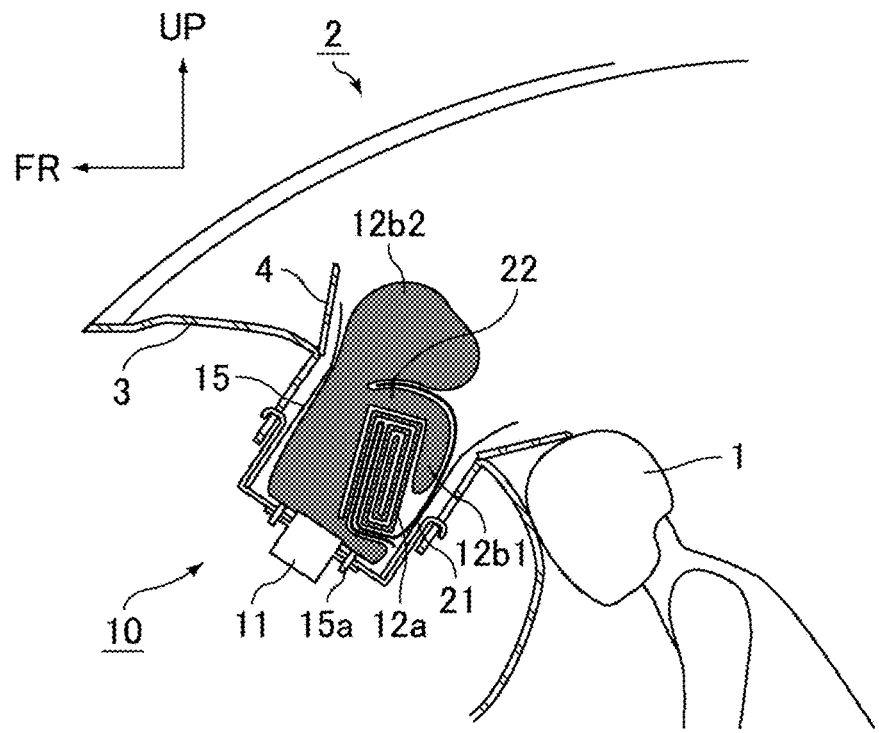
FIGS. 14A and 14B are views related to OOP inflation and deployment of the airbag of the embodiment, illustrating a state immediately after the inflation and deployment, with FIG. 14A being a cross-sectional view thereof and FIG. 14B being a front view thereof.
Figure 14B:
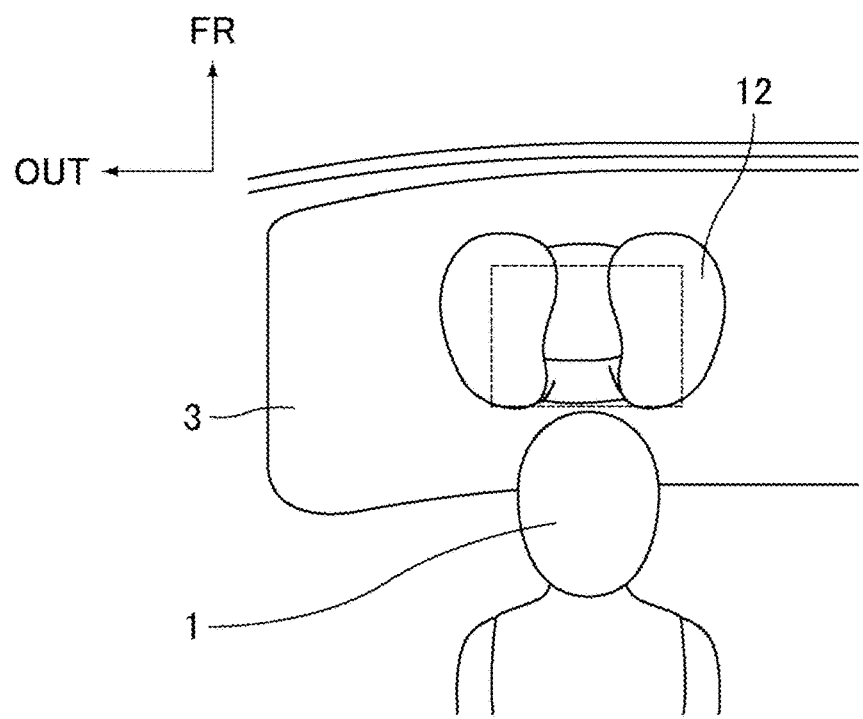

As illustrated in FIGS. 14A and 13B, when a collision of the vehicle 2 is detected and then the airbag device 10 is activated, the airbag 12 is rapidly inflated by the gas generated by the inflator 11. In the initial stage of inflation and deployment where the airbag 12 begins to be inflated and deployed, the flip folded portions 12b1 and 12b2 of the airbag 12 in a folded state which more easily allow introduction of the gas than the roll folded portion 12a are first inflated, and are inflated and deployed through the opening 15b of the holding member 15. At this time, the second restricting portion 22, being secured to the airbag 12 between the flip folded portions 12b1 and 12b2, is moved as the flip folded portions 12b1 and 12b2 are inflated. Simultaneously, the roll folded portion 12a is pushed toward the holding member 15 side as the flip folded portion 12b1 is inflated, so that inflation and deployment of the roll folded portion 12a are inhibited. Since inflation of the flip folded portions 12b1 and 12b2 leads to inflation of the end-folded portions 12c communicating with the respective ends of the flip folded portions 12b1 and 12b2, the end-folded portions 12c push open the lid 4 to come out to the interior space of the vehicle and be inflated and deployed as described above.

Here, one of the turning doors of the opened lid 4 comes into contact with the head of the OOP occupant 1 and is stopped.

Figure 15A:
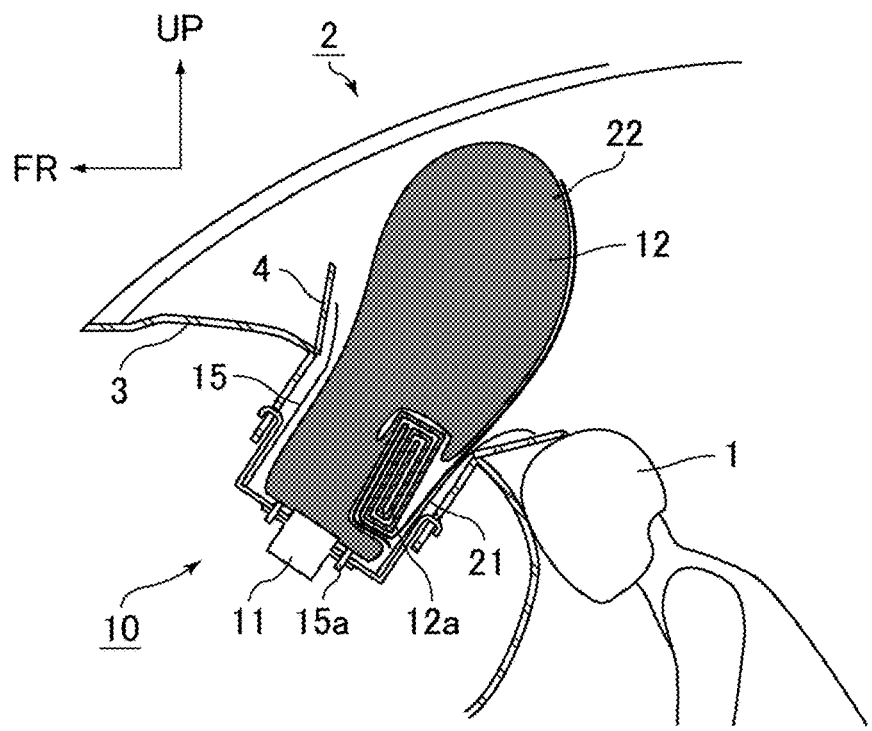
FIGS. 15A and 15B are views related to OOP inflation and deployment of the airbag of the embodiment, illustrating a state immediately after contact between an occupant and the airbag whose shape and direction of the inflation and deployment are restricted by a flap under tension, with FIG. 15A being a cross-sectional view thereof and FIG. 15B being a front view thereof.
Figure 15B:
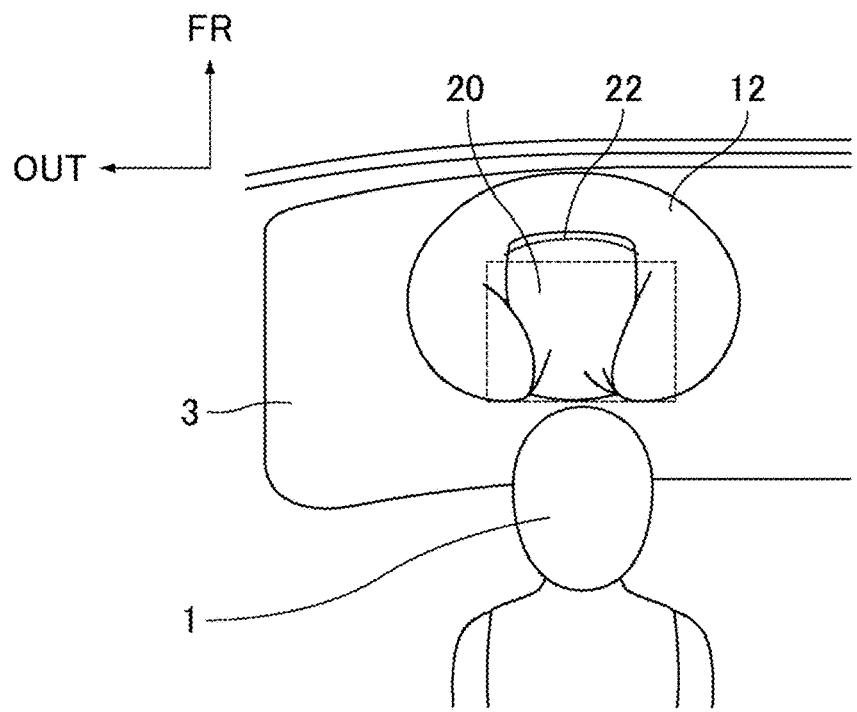

To each of the inflated flip folded portions 12b1 and 12b2 is further introduced the gas, which causes further inflation as illustrated in FIGS. 15A and 15B. As a result, the flip folded portions 12b1 and 12b2 form one inflated portion, with the second restricting portion 22 being exposed on the outer surface of the airbag 12. Here, as the flip folded portion 12b1 to which the second restricting portion 22 is secured is further inflated while the first restricting portion 21 is held between the holding member 15 and the roll folded portion 12a of the airbag 12, tension is generated in the flap 20 between the second restricting portion 22 secured to the one inflated portion and the first restricting portion 21 held between the holding member 15 and the roll folded portion 12a of the airbag 12. The tension generated in the flap 20 is applied to part of the airbag 12 in the vehicle width direction and causes the flap 20 to restrict deployment of the part of the airbag 12 to the occupant 1 side. In other words, the flap 20 generating tension allows inflation of the flip folded portions 12b1 and 12b2 to the vehicle front side while restricting their inflation to the vehicle rear side. Also, when the occupant 1 comes into contact with the inflated and deployed airbag 12 for the first time, inflation and deployment of the roll folded portion 12a is restricted, and the pressure from the airbag 12 applied to the head of the occupant 1 is low. Meanwhile, the portions which are not under restriction by the flap 20, i.e., the portions on the right and left sides of the flap 20, can be inflated and deployed. In other words, the end-folded portions 12c which are not under restriction by the flap 20 can be inflated and deployed on the instrument panel 3. Specifically, since the occupant 1 side of each end-folded portion 12c is also roll-folded, the vehicle front side (flip folded part) thereof is inflated and deployed first.

Figure 16A:
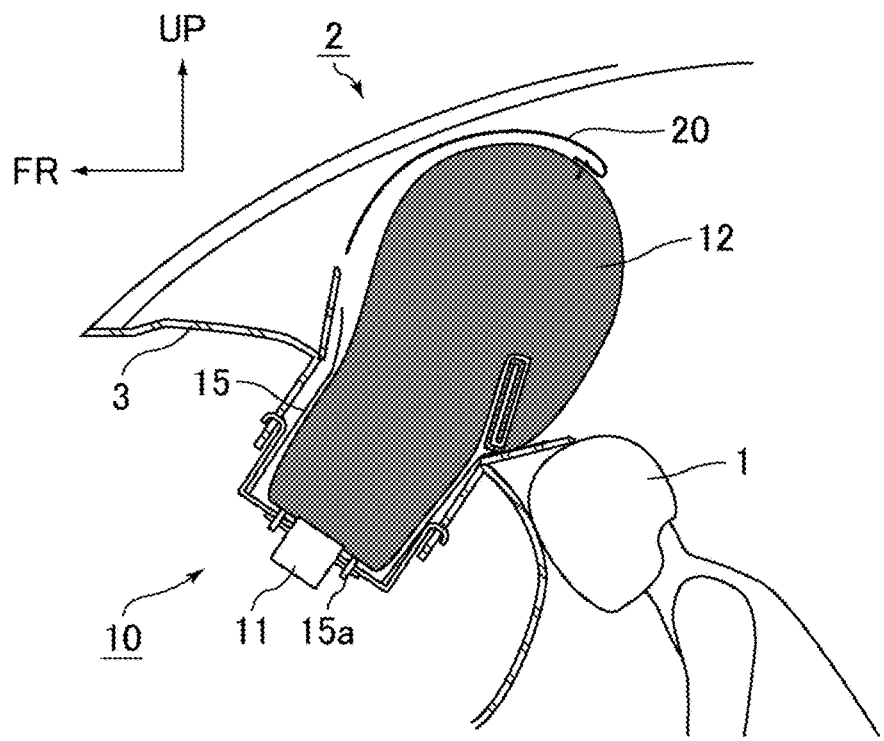
FIGS. 16A and 16B are views related to OOP inflation and deployment of the airbag of the embodiment, illustrating a state immediately after removal of the restriction by the flap, with FIG. 16A being a cross-sectional view thereof and FIG. 16B being a front view thereof.
Figure 16B:
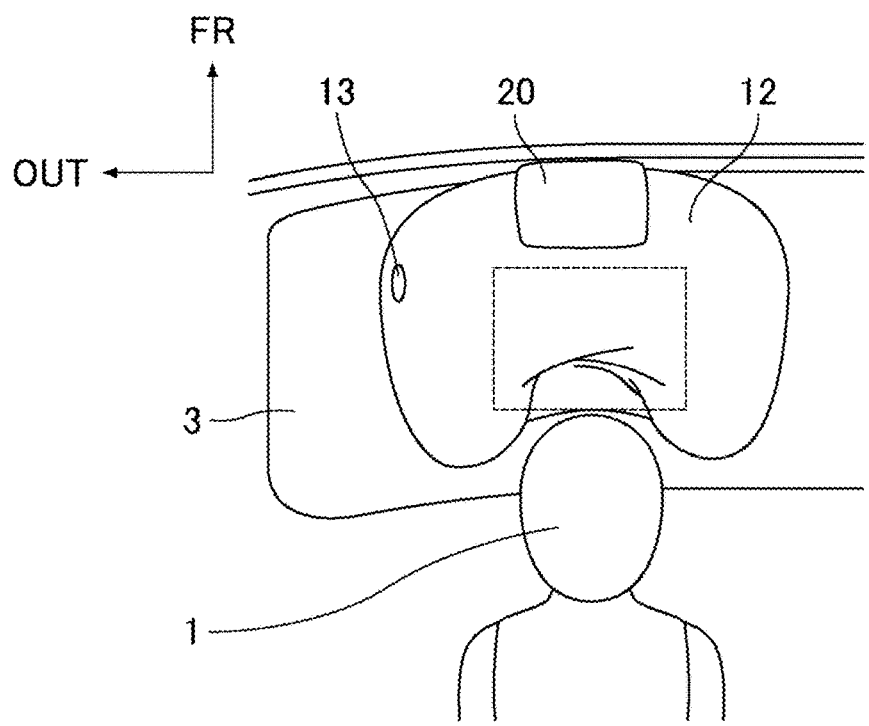

As illustrated in FIGS. 16A and 16B, the end-folded portions 12c are then further inflated and deployed so that the roll-folded vehicle rear sides (the occupant 1 sides) thereof are also inflated and deployed by the gas having flown therein. At this time, there is a space between each lateral side of the head of the occupant 1 and the instrument panel 3, which causes the vehicle rear side of each end-folded portion 12c to be deployed between the corresponding lateral side of the head of the occupant 1 and the instrument panel 3. Meanwhile, the second restricting portion 22 of the flap 20 secured between the flip folded portions 12b1 and 12b2 is kept moving as the flip folded portions 12b1 and 12b2 are inflated and deployed. This movement eventually draws the first restricting portion 21 of the flap 20 out of the portion between the holding member 15 and the roll folded portion 12a of the airbag 12. Thereby, the tension generated in the entire flap 20 is automatically released, so that the roll folded portion 12a is inflated and deployed in the outside of the instrument panel 3.

Figure 17A:
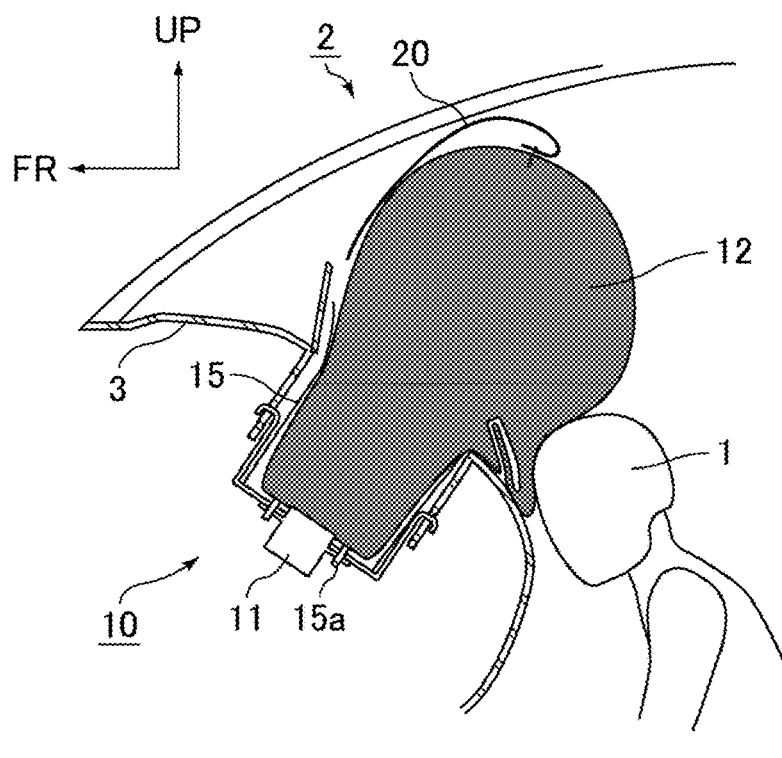
FIGS. 17A and 17B are views related to OOP inflation and deployment of the airbag of the embodiment, illustrating a state after removal of the restriction by the flap, with FIG. 17A being a cross-sectional view thereof and FIG. 17B being a front view thereof.
Figure 17B:
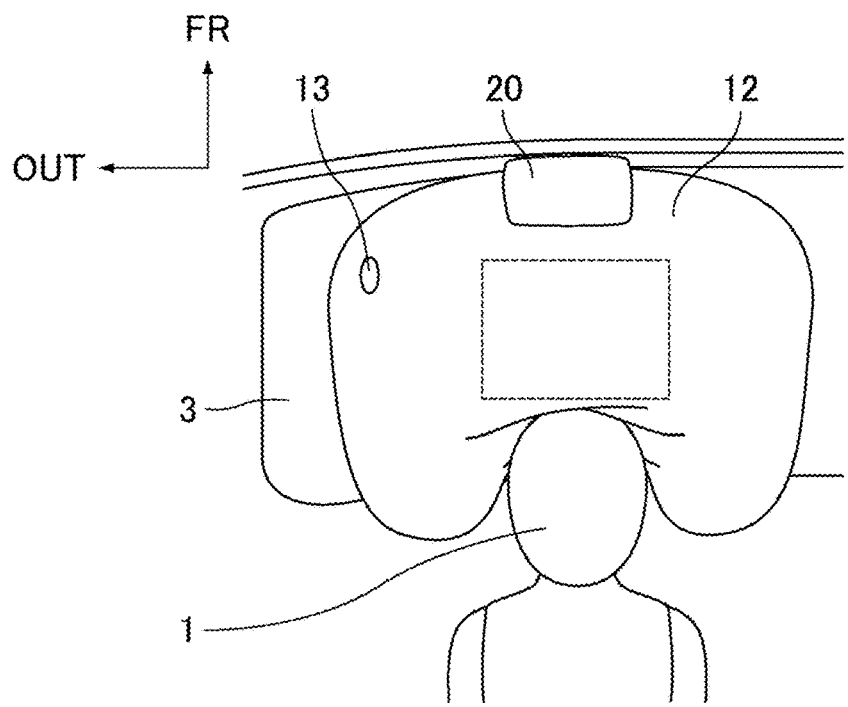

As illustrated in FIGS. 17, the end-folded portions 12c deployed between the respective lateral sides of the head of the occupant 1 and the instrument panel 3 are then further inflated and deployed, slowly lifting the head of the occupant 1. This behavior produces a clearance between the head of the occupant 1 and the instrument panel 3, into which the flip folded portions 12b1 and 12b2 and the roll folded portion 12a beginning to be inflated and deployed are inflated and deployed.

Figure 18A:
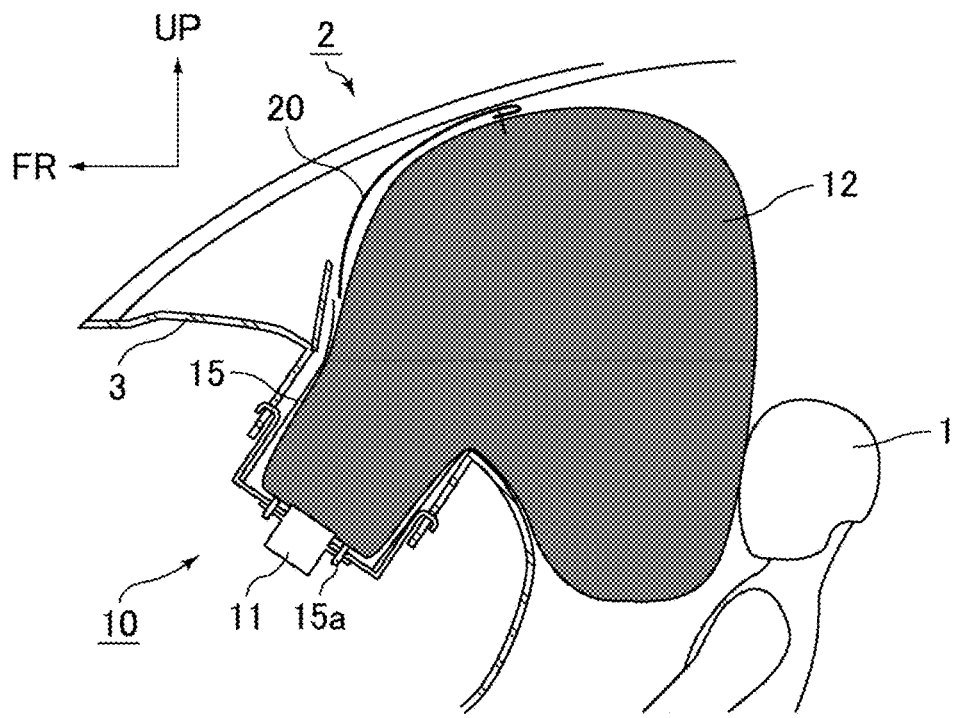
FIGS. 18A and 18B are views related to OOP inflation and deployment of the airbag of the embodiment, illustrating a complete state of the inflation and deployment, with FIG. 18A being a cross-sectional view thereof and FIG. 18B being a front view thereof.
Figure 18B:
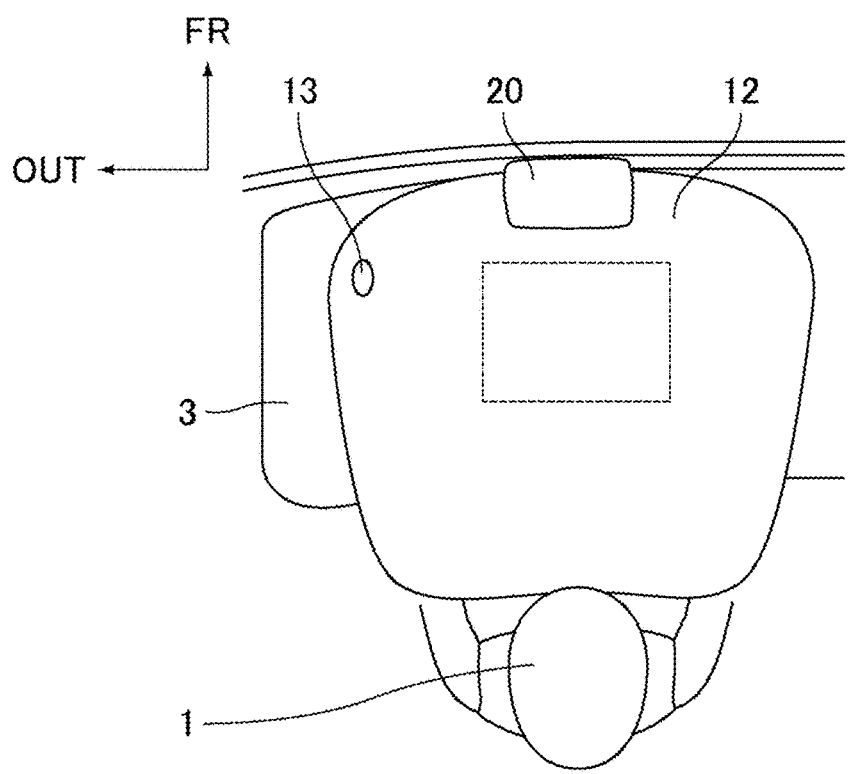

After the end-folded portions 12c lift the head of the occupant 1, as illustrated in FIGS. 18A and 18B, the roll folded portion 12a inflated and deployed into the clearance between the head of the occupant 1 and the instrument panel 3 moves the occupant 1 to the vehicle rear side while being further inflated and deployed. This configuration avoids excessively strong pressing of the occupant 1 by inflation and deployment of the roll folded portion 12a.

As described above, the airbag 12 of the present embodiment utilizes the tension generated in the flap 20 to restrict the shape and direction of inflation and deployment of the airbag 12. Specifically, the flap 20 generating tension allows inflation of the flip folded portions 12b1 and 12b2 to the vehicle front side while restricting their inflation to the vehicle rear side. This configuration enables prevention of the airbag 12 from protruding to the occupant 1 side in the initial stage of inflation and deployment for proper protection of the head of the OOP occupant 1, providing improved safety.

Since the airbag 12 of the present embodiment can also control the direction of inflation and deployment of the airbag 12 in the initial stage by the folding manner of the airbag 12 and simple attaching of the flap 20, the airbag 12 does not need to have a complicated shape. The airbag 12 with excellent safety can therefore be produced through simple steps, and the airbag 12 also has excellent productivity.

In the present embodiment, one of the two flip folded portions 12b1 and 12b2, namely the flip folded portion 12b1 disposed between the flap 20 and the roll folded portion 12a, is preferably disposed to cover the vehicle front side of the roll folded portion 12a. The flip folded portion 12b1 covering the roll folded portion 12a can be inflated while keeping the state of covering the roll folded portion 12a. This configuration can further restrict outward deployment of the roll folded portion 12a from the holding member 15 and is more likely to retain the roll folded portion 12a in the holding member 15.

Also in the present embodiment, each end of the airbag 12 in the vehicle width direction is preferably disposed in a folded state on the opening 15b side of the holding member 15. Such an airbag 12 can slowly lift the head of the occupant 1 using the end-folded portions 12c deployed between the respective lateral sides of the head of the occupant 1 and the instrument panel 3 even in the case where the airbag device 10 is activated when the head of the OOP occupant 1 is in contact with a portion of the instrument panel 3 in the vicinity of the lid 4. This configuration can therefore inflate and deploy the airbag 12 while preventing excessively strong pressing of the head of the occupant 1.

The embodiment of the present invention described above is not intended to limit the scope of the present invention. The configurations in the embodiment may appropriately be deleted, supplemented, modified, and combined within the spirit of the present invention. For example, the airbag device of the present invention may be disposed in front of the driver's seat to protect the occupant in the driver's seat. A preferred position for the airbag device in front of the driver's seat is the inside of the steering wheel.

What is claimed is:

1. An airbag device to be mounted in a vehicle, comprising:
   an inflator configured to generate a gas;
   an airbag configured to be inflated with the gas generated by the inflator;
   a holding member housing the airbag in a folded state and being provided with an opening which allows inflation and deployment of the airbag therethrough; and
   a flap configured to restrict inflation and deployment of the airbag through the opening,
   the airbag comprising a roll folded portion being roll-folded and disposed on an occupant side, and two flip folded portions each being accordion-folded or tucked inside and disposed on a vehicle front side, the flap comprising a first restricting portion covering the roll folded portion and being held between the roll folded portion and the holding member, and a second restricting portion being secured to the airbag between the two flip folded portions.

2. The airbag device according to claim 1, wherein one of the two flip folded portions disposed between the flap and the roll folded portion is disposed to cover the vehicle front side of the roll folded portion.

3. The airbag device according to claim 1, wherein each end of the airbag in the vehicle width direction is disposed in a folded state on the opening side.

4. The airbag device according to claim 2, wherein each end of the airbag in the vehicle width direction is disposed in a folded state on the opening side.

\* \* \* \* \*